(12) United States Patent
Decker et al.

(10) Patent No.: US 6,798,642 B2
(45) Date of Patent: Sep. 28, 2004

(54) POLYMER COATED CAPACITOR FILMS

(75) Inventors: Wolfgang Decker, N. Kingstown, RI (US); Shawn Early, N. Kingstown, RI (US)

(73) Assignee: Toray Plastics (America), Inc., North Kingstown, RI (US)

( * ) Notice: Subject to any disclaimer, the term of this patent is extended or adjusted under 35 U.S.C. 154(b) by 0 days.

(21) Appl. No.: 10/350,333

(22) Filed: Jan. 24, 2003

(65) Prior Publication Data

US 2003/0142461 A1 Jul. 31, 2003

Related U.S. Application Data

(60) Provisional application No. 60/350,355, filed on Jan. 24, 2002.

(51) Int. Cl.[7] .................................................. H01G 4/06
(52) U.S. Cl. ...................... 361/311; 361/511; 361/323; 361/507; 361/307; 361/306.3; 361/304; 361/100
(58) Field of Search .................................. 361/311, 323, 361/307, 303, 507, 511, 304, 306.3, 100

(56) References Cited

U.S. PATENT DOCUMENTS

| 3,854,075 A | * | 12/1974 | Uhi ............................. 361/307 |
| 3,944,895 A | | 3/1976 | Williams |
| 4,667,382 A | * | 5/1987 | Behn et al. ................. 29/25.42 |
| 4,771,362 A | * | 9/1988 | Behn ........................ 361/301.4 |
| 4,882,653 A | * | 11/1989 | Suzuki et al. ............... 361/323 |
| 5,055,965 A | * | 10/1991 | Rayburn ..................... 361/303 |
| 5,540,974 A | * | 7/1996 | Hoseki et al. .............. 428/141 |

FOREIGN PATENT DOCUMENTS

JP        5-6835       1/1993

* cited by examiner

*Primary Examiner*—Anthony Dinkins
*Assistant Examiner*—Anton Harris
(74) *Attorney, Agent, or Firm*—Morrison & Foerster LLP

(57) ABSTRACT

This invention relates to capacitor films that have increased moisture and breakdown resistance. The capacitor films include a polymer coating that helps prevent air entrapment.

39 Claims, 4 Drawing Sheets

POLYMER COATED CAPACITOR FILMS

FIELD OF THE INVENTION

This invention relates to film capacitors made from metallized polymer films and to methods for making film capacitors. The capacitors have increased moisture and breakdown resistance.

BACKGROUND

Typically, metallized film capacitors include two tightly wound sheets, wrapped around a core. Each sheet includes a dielectric layer and a metallized layer. The metallized layer does not extend to the opposing ends of the sheet leaving a non-metallized margin on opposing sides of each sheet. The ends of the roll formed from the two tightly wound sheets are sprayed with a conductive metal to form a conducting termination for the capacitor. Capacitors made in this way can be used for a variety of purposes depending upon factors such as the type of sheet material as well as the thickness and dielectric constant of the sheet. Typical materials for the sheet are, for example, oriented polypropylene or poly-(ethylene)-terephtalate. The conductive metal termination is typically applied in a vacuum metallizer and is generally comprised of aluminum, zinc or alloys thereof.

A common problem during the manufacturing of metallized film capacitors is the entrapment of air during the winding process. Air gaps inside the capacitors can allow water to penetrate in between the dielectric sheets, corroding the thin metallized layers. This corrosion can reduce the active area of the capacitor and its capacitance. Air entrapment can also cause corona discharges to occur during use. Corona discharges can degrade the dielectric material and the metallized layer, which can result in capacitance loss. Several methods have been devised to improve moisture resistance and reduce the amount of air entrapped in a wound film capacitor.

The most common method of improving moisture resistance is vacuum impregnation. In this process, after the capacitor has been wound and terminated in a spray-coating process, the capacitor is immersed in a bath of dielectric fluid or resin such as epoxy resin, polyurethane resin or proprietary organic resins. Examples of the resins can be found in U.S. Pat. Nos. 4,897,791 and 6,014,308. Exposing the capacitor to a vacuum while in the bath causes the entrapped air to diffuse out of the tightly wound capacitor. The capacitor is then exposed to a higher pressure while still immersed in the bath causing the fluid to penetrate into the minute gaps between the layers. The capacitor is then removed from the bath and the resin is allowed to cure. The resin seals the capacitor, improving its moisture resistance.

However, the penetration of the dielectric fluid into the tightly wound capacitor during vacuum impregnation typically is not complete. Furthermore, the dielectric fluid also penetrates into voids and covers the surface of the spray coated termination, making the welding or soldering of terminals to surfaces of the spray coated terminations difficult or impossible. Impregnation of the capacitor prior to spray termination is difficult, since the dielectric fluids tend to cover the metal exposed on the terminal ends of the metallized layer, making it difficult to achieve sufficient contact during the spray coating process. U.S. Pat. No. 5,043,843 teaches how this problem can be overcome by impregnating the capacitor prior to spray termination and by cleaning the terminal edges through etching with reactive gas plasma.

Wound capacitors that are used in dry applications often face the problem of losing tension on the outer windings. This loss of tension can cause the outer windings to develop gaps which can create the aforementioned problems of air/moisture intrusion and corona discharge. The problem of air/moisture intrusion is not as serious of a problem in oil filled capacitors. The oil fills the gaps in the capacitors effectively sealing the outer windings. Capacitors in dry applications, however, can lose capacitance due to this effect.

Accordingly, a need exists for an improved method of decreasing the entrapment of air and increasing the moisture resistance of a capacitor.

SUMMARY OF THE INVENTION

The invention includes capacitor films and capacitors that have increased moisture and breakdown resistance. The capacitor films include a polymer coating that helps prevent air entrapment.

In one embodiment, the capacitor film is a metallized film. The metallized film is a dielectric film with a metal layer deposited on a portion of a surface of the dielectric film. The surface of the dielectric film upon which the metal layer is deposited, has a margin portion, which is free of deposited metal. A layer of heat fusible polymer is coated over the metal layer and margin portion.

Preferably, the dielectric film is made from a heat fusible polymer made from a polymer which has a melting point below or at a curing temperature of the dielectric film. A preferred heat fusible polymer is made from a polyethylene and has a thickness of 0.1 μm to 1.5 μm.

The metallized film can be formed into a capacitor by rolling the film or by stacking the film in layers. Preferably, heat and pressure is applied during the winding or stacking process to exclude air and to fuse the metallized film together. The capacitor can also be exposed to reduced pressure to extract entrapped air and, while under reduced pressure, exposed to heat to cause the heat fusible polymer to fuse the layers of the capacitor.

In another embodiment of the metallized film a layer of heat fusible polymer is placed on a surface of the dielectric film opposite the surface upon which the metal layer was deposited.

In yet another embodiment of the metallized film, the metallized film contains a dielectric film and a first and a second metal layer. The first metal layer is deposited on a portion of the first surface of the dielectric film, and the first surface has a first margin portion which is free of deposited metal. The second metal layer is deposited on a portion of the second surface of the dielectric film, and the second surface has a second margin portion which is free of deposited metal. The second margin portion is located on the opposite edge of the dielectric film from the first margin portion. A layer of heat fusible polymer is deposited on the first surface of the dielectric film, the second surface of the dielectric film or on both the first and second surfaces of the dielectric film.

One embodiment of the method of making a metallized film includes providing a dielectric film, depositing a metal layer onto a surface of the dielectric film, and depositing a heat fusible polymer layer onto a surface of the dielectric film or onto the metal layer.

An another embodiment the capacitor includes a dielectric film layer, a metal layer, a heat fusible polymer layer. A preferred way of making the capacitor is by stacking layers of a capacitor film having a dielectric film layer, a metal layer, and a heat fusible polymer layer or by winding a capacitor film having a dielectric film layer, a metal layer, and a heat fusible polymer layer around a core.

BRIEF DESCRIPTION OF THE DRAWINGS

The invention will be better understood by reference to the Detailed Description of the Invention when taken together with the attached drawings, wherein.

DETAILED DESCRIPTION OF THE INVENTION

Figure 1:
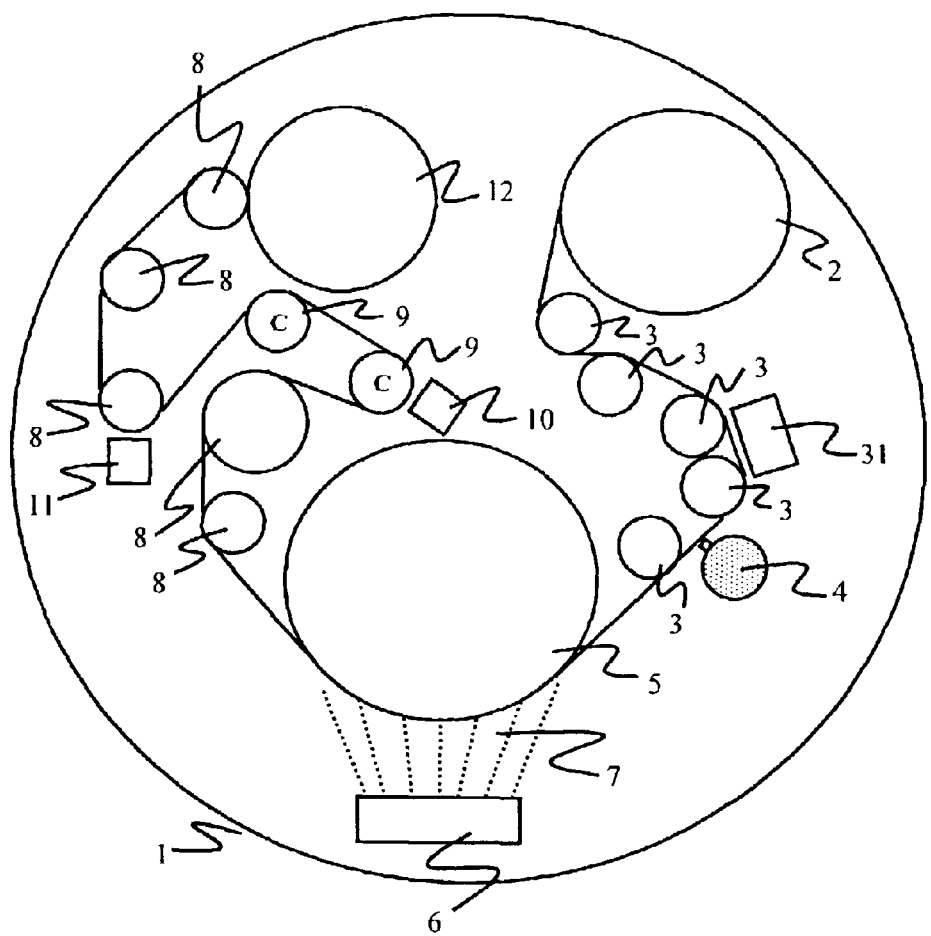
FIG. 1 is a vacuum metallizing and coating device for masked deposition of metals and deposition of a wax coating on a capacitor film.

Capacitor films and capacitors using the capacitor films are described herein. The capacitors have excellent moisture resistance and reduced capacitance loss due to unwanted air and moisture entrapment. Methods of making capacitor films and capacitors with excellent moisture resistance and reduced capacitance loss due to unwanted air and moisture entrapment are also described.

In one embodiment, the film capacitor has a capacitor element having: (a) a multilayer structure of at least two wound dielectric films, each dielectric film having a metallic layer formed on its surface; and (b) a coating layer made from a polymer material, the layer being applied either on top of the metallic layer or on the back side of the dielectric material. The polymer coating material is preferably a low molecular weight polyethylene, polypropylene or the like. Preferably, the polymer coating material is heat fusible and has a melting point of about 100° C. to about 120° C.

Preferably, the heat fusible polymer coating has a thickness of about 0.1 $\mu$m to about 1.5 $\mu$m. More preferably, the heat fusible polymer coating has a thickness of about 0.2 $\mu$m to about 1.0 $\mu$m. Most preferably, the heat fusible polymer coating has a thickness of about 0.3 $\mu$m to 0.8 $\mu$m.

If the thickness of the heat fusible polymer coating is too small, insufficient moisture protection is provided by the polymer coating. If the thickness of the heat fusible polymer coating is too large, seepage of the heat fusible polymer coating from the capacitor during curing can occur.

A preferred method for manufacturing a film capacitor includes: (1) metallizing a dielectric film with a layer of metal containing zinc, copper, aluminum or alloys thereof, preferably, a clear margin is formed around the layer of metal by common methods such as band masking or oil masking as explained in U.S. Pat. No. 6,018,454; (2) during or right after the formation of the metal layer, but preferably within the same process (vacuum) chamber, applying a heat fusible polymer coating on top of the metal layer or on the backside of the dielectric film; (3) producing a wound capacitor with common methods that include slitting of the metallized and coated dielectric to proper width, winding the capacitor in appropriate equipment and spray terminating the wound capacitor to allow subsequent attachment of leads to the terminals of the capacitor; (4) curing the capacitor by exposing the wound capacitor to reduced pressure, thus allowing entrapped air to diffuse out of the gaps between the windings, and (5) subsequent heating of the capacitor to about 100° C. to about 120° C.

Heating the wound capacitor causes the dielectric material to shrink and the winding to tighten. Heating the capacitor also partly liquefies the heat fusible polymer coating, which, in conjunction with the shrinkage of the dielectric, fuses the layers of the winding to each other, eliminating gaps into which air or water can enter. The hydrophobic property of the heat fusible polymer coating can also prevent water from diffusing into the winding, improving the moisture resistance of the capacitor.

Another preferred method of manufacturing a film capacitor according to this invention is: (1) metallizing a dielectric film with a layer of metal containing zinc, copper, aluminum or alloys thereof, preferably, a clear margin is formed around the layer of metal by common methods such as band masking or oil masking; (2) during or right after the formation of the metal layer, but preferably within the same process (vacuum) chamber, applying a heat fusible polymer coating on top of the metal layer or on the backside of the dielectric film; and (3) producing a wound capacitor by common methods that include slitting of the metallized and coated dielectric to proper width, winding the capacitor in appropriate equipment with application of heat and pressure during the winding and spray terminating the wound capacitor to allow subsequent attachment of leads to the terminals of the capacitor. Application of heat and additional pressure during the winding process causes the heat fusible polymer coating to melt creating a laminated wound structure. The right choice of heat, pressure and process condition can exclude air entrapment during the winding and laminating process. A curing step is not needed for this method.

Preferably, a polymer film such as those generally used for film capacitors is used as a dielectric base film for the metallized film. Examples of such polymer films are oriented polyester or polypropylene films. Although there is no limitation as to the type of polymer film used in this invention, oriented polyester or polypropylene film is preferred. There is also no limitation on the range of thickness for this film, however, a thickness in the range of about 0.6 $\mu$m to about 15 $\mu$m is preferred.

A preferred metallized film is a polymer film with at least one layer of metal on at least one side of the polymer film. Preparation of the metal layer typically is performed by a vacuum deposition process. FIG. 1 shows a preferred apparatus for producing a metallized film. A vacuum chamber 1 containing a transport system and an evaporator 6 is reduced to a predetermined pressure by a vacuum pump. Dielectric film 2 is unwound and transported through the chamber by an arrangement of driven and idling rollers 3. The dielectric film 2 goes over a chilled coating drum 5 while passing through a cloud of evaporated metal 7 generated by a metal evaporator 6. The cool surface of dielectric film 2 causes the metal 7 to condense on the surface of the dielectric film 2 forming a thin layer of metal. The metallized film 2 is then passed over another arrangement of driven and idling rollers 8 and rewound at 12.

Although not required, particularly if dielectric films with high surface functionality are used, but preferred, a surface treatment 31 may be to activate a side of the dielectric film for the deposition of the metal layer. A preferred surface treatment 31 exposes the film to an ionized gas, i.e. plasma. A margin system 4 deposits thin layers of an oil onto the surface of dielectric film 2 around the boundary of the film. The oil prevents the deposition of metal in these areas, forming metal free margins. Other masking systems such as a masking tape system can be used as well. The metal evaporator 6 can be of any kind capable of creating a metal vapor cloud that is sufficient to condense metal onto the surface of the dielectric film at appropriate speed. For example, resistively heated evaporators, electron beam evaporators or sputter sources can be used. Different metals can be used, such as, but not limited to, aluminum, copper or zinc. In the case of aluminum and/or copper, direct deposition with only one stage is possible. Preferably, if zinc is used, a "seeding layer" of aluminum, copper or silver is applied to the film prior to the deposition of the zinc layer. The "seeding layer" can improve the deposition rate and the properties of the zinc coating.

A heat fusible polymer coating is applied to dielectric film 2 during the coating process. The heat fusible polymer coating can be applied to dielectric film 2 either on the side of the dielectric film opposite the metallized layer using applicator 10 or on top of the metal layer using applicator 11, or on both sides of the dielectric film.

Figure 2:
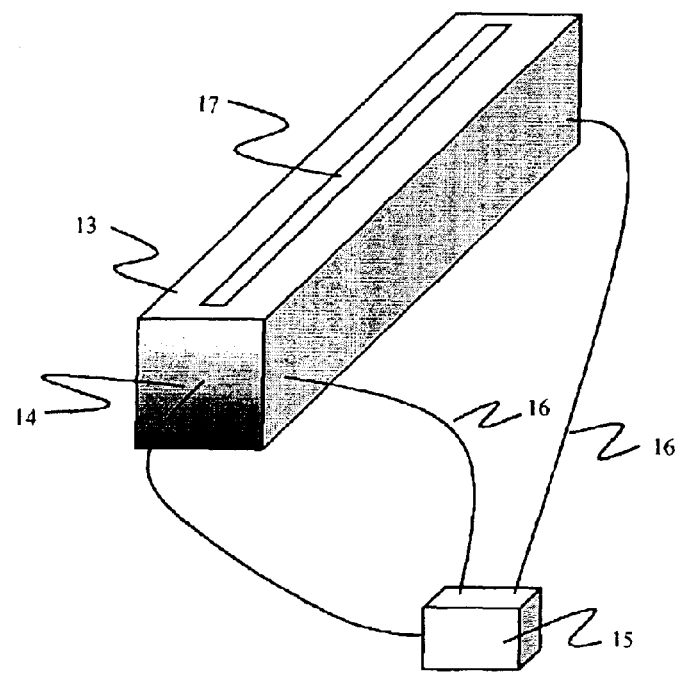
FIG. 2 is a vapor coating device for depositing a wax coating.

FIG. 2 shows a preferred applicator for applying a heat fusible polymer coating to the dielectric film. The applicator is a hollow metal box 13 that is capable of being heated. Power 16 is supplied to this box from a heating control system 15 that receives its control input from a thermocouple 14 attached to the box. This setup allows the temperature of the box to be controlled during the coating process. The heat fusible polymer coating material that is applied to the film is placed in box 13 and heated. Since box 13 and its contents are exposed to the same or similar reduced pressure as is the metal deposition process, it is possible to heat the wax to a temperature that is below its thermal degradation point but high enough that the vapor pressure associated with this temperature exceeds the pressure of the process environment. This allows the generation of a constant vapor flux from the material, which exits box 13 through slit 17. Slit 17 is arranged in a way so that it faces the surface of the dielectric film that is to be coated with the evaporated material, and allows uniform distribution of the vapor across the width of the dielectric film. Since the surface temperature of the dielectric film is lower than the vapor pressure of the wax material, the wax will condense on the substrate surface.

The heat fusible polymer coating material can be of any kind of polymer that can be evaporated at appropriate rates at the pressure levels used in the vacuum coating chambers and at temperatures below the thermal degradation temperature of the polymer. Furthermore, the material should allow fusion between the layers of the final capacitor at temperatures at or below the curing temperature of the capacitor. A large variety of different polymers fulfills this requirement.

In the preferred embodiment, low molecular weight polyethylenes such as Polywax®, produced and distributed by Baker Petrolite, Sugarland, Tex., are used. These polymers are characterized by a very narrow molecular weight distribution that allows constant evaporation of the polymer in the vacuum evaporator without a change in the molecular weight distribution during the coating procedure. Preferably, the polymer has a weight average molecular weight of about 500 to about 3000. More preferably, the polymer has a weight average molecular weight of about 700 to about 1500.

Figure 3:
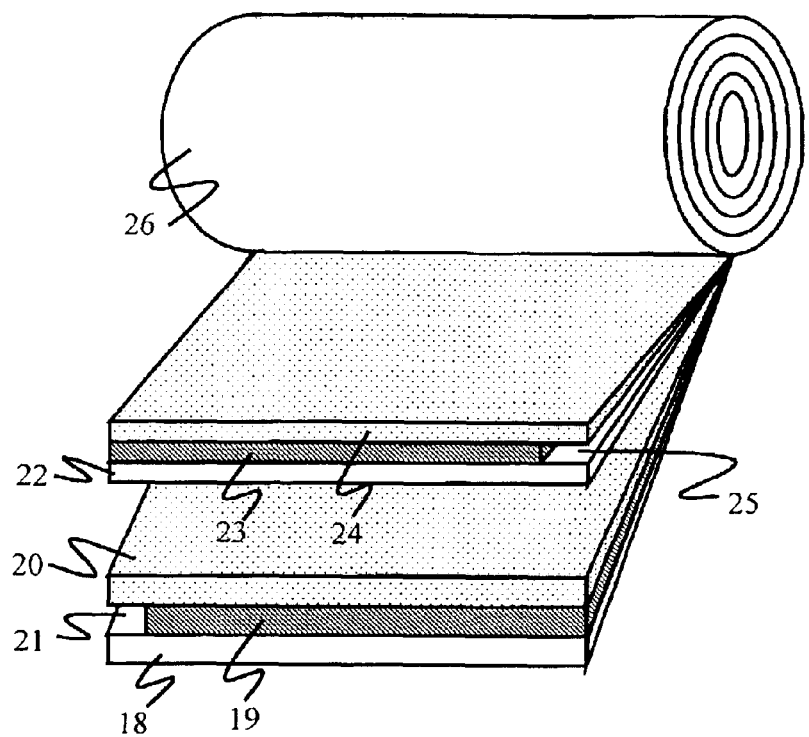
FIG. 3 is a wound capacitor formed from two layers of capacitor film.

FIG. 3 shows one embodiment of a wound capacitor 26. The coated and rewound material is processed by slitting and then wound into a capacitor, as is common in the art. The wound capacitor 26 is produced by interleaving and winding two dielectric films 18 and 22 coated with at least one layer of metal 19 and 23 on each of the dielectric films. The metal layers 19 and 23 do not extend to the edge of dielectric films 18 and 22 forming a clear or non-metallized margin at the edge of the film 21 and 25. The clear margins 21 and 25 are located on opposite sides from each other. Heat fusible polymer coatings 20 and 24 are applied over metal layers 19 and 23.

Figure 4:
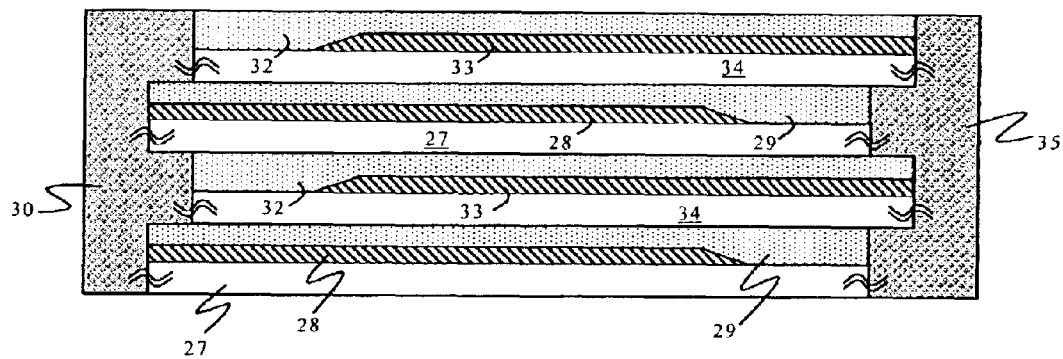
FIG. 4 is a cross section illustrating the stacking of different layers in a wound or stacked capacitor.

FIG. 4 shows the interleaved dielectric films 27 and 34 with their respective metal layers 28 and 33 and heat fusible polymer coatings 29 and 32. The offset between the two dielectric films 27 and 34, as shown in FIG. 4, is preferred to achieve better connection with the spray coated terminations 30 and 35, but it is not required.

The wound and terminated capacitor is preferably exposed to a reduced pressure environment to allow air entrapped between the tightly wound dielectric layers and in the spray coating layers to diffuse out of the capacitor. While still under the reduced pressure, the capacitor is then exposed to a curing cycle. The curing cycle includes heating the capacitor to a set temperature. The curing temperature depends on the dielectric material and the heat fusible polymer coating material used.

In a preferred embodiment, where an oriented polypropylene is used as the dielectric and a Polywax® type polyethylene with a molecular weight between 700 and 1500 is used as the heat fusible polymer coating, the curing temperature is preferably between 120° C. and 140° C.

Figure 5:
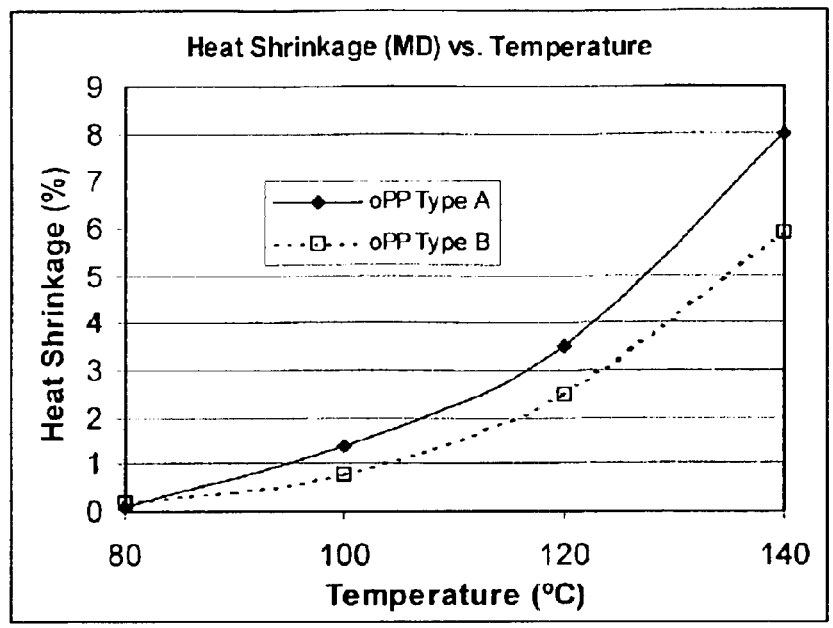
FIG. 5 is a graph of Shrinkage in Machine Direction (MD) of a bi-oriented oPP dielectric capacitor film in percentage vs. Temperature.

FIG. 5 shows the shrinkage for the oriented polypropylene dielectric when exposed to temperatures between 120° C. and 140° C. According to FIG. 5, the dielectric shrinks between 2.5 and 8%.

Figure 6:
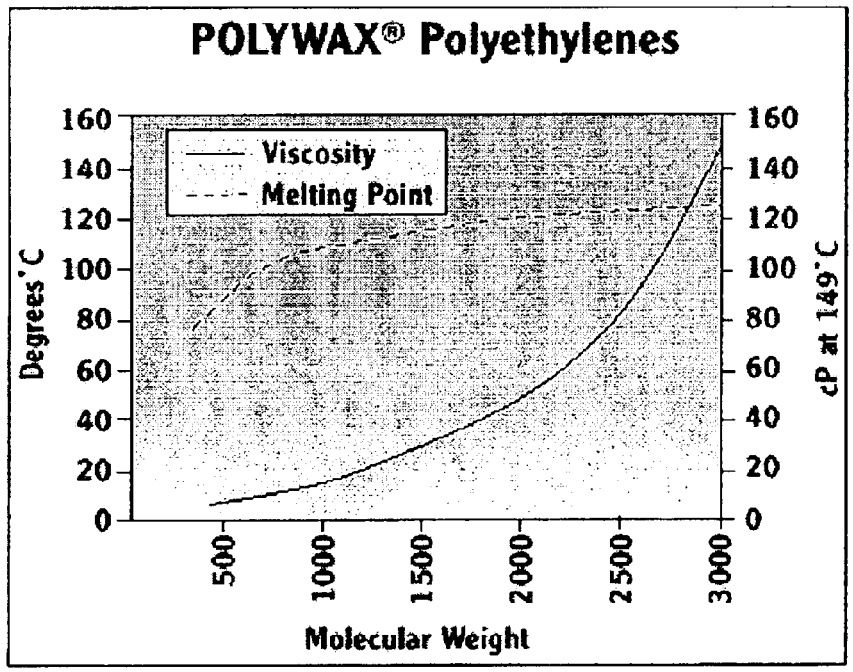
FIG. 6 is a graph representing the viscosity and melting temperature of Polywax® Polyethylenes vs. Molecular Weight of the Polyethylene.

FIG. 6 shows the melting temperature of Polywax® polyethylenes as a function of weight average molecular weight. According to FIG. 6, the curing temperature exceeds the melting temperature of the coating made from the preferred molecular weight range of polymer. The combination of liquefaction of the polymer, densification of the wound structure due to shrinkage of the dielectric film, and absence of air between the windings, fuses the layers of the capacitor structure together when the temperature is lowered and the heat fusible polymer coating re-solidified. The solid nature of the wound structure after cooling and exposure to normal air prevents air and moisture from entering into the capacitor, greatly enhancing the performance of the capacitor.

Figure 7:
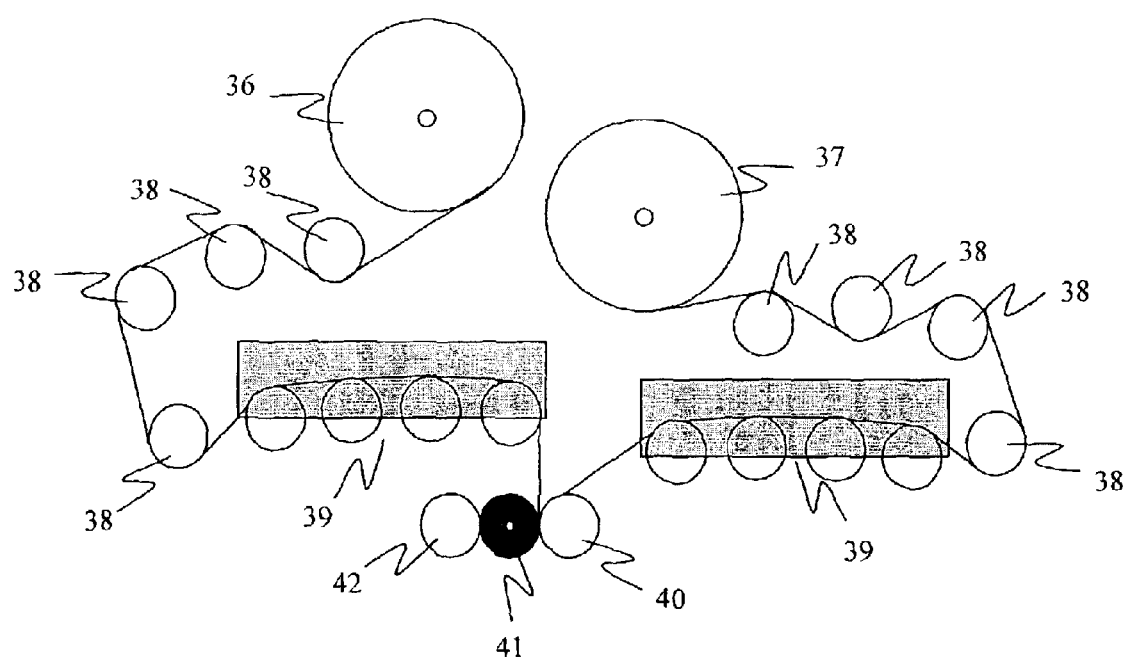
FIG. 7 is a capacitor winding device incorporating a heating and lamination function.

In another embodiment, the air exclusion and solidification of the capacitor achieved by laminating the different layers during the winding process. FIG. 7 shows an apparatus for laminating the layers according to this embodiment. In FIG. 7, the two dielectric films coated with the aforementioned layers of metal and polymer are unwound from role 36 and 37 and transported over an assembly of driven and idling rollers 38. Before the two dielectric films are wound into a capacitor 41, they each pass through a heating system 39 that causes the heat fusible polymer coating to liquefy. Nip rollers 40 and 42 apply pressure onto the winding to exclude air from entering the winding and to fuse the two interleaved layers of dielectric film together. The wound capacitor 41 then solidifies while cooling and can be further processed for termination. The advantage of this is that a vacuum curing cycle is not required, however, the exclusion of air may not be as complete.

Those of ordinary skill in the art will recognize that the heat fusible polymer coating can be applied by many different methods in addition those previously described. For example, the heat fusible polymer coating can be applied to the dielectric film using an extrusion coating process.

The above description is presented to enable a person skilled in the art to make and use the invention, and is provided in the context of a particular application and its requirements. Various modifications to the preferred embodiments will be readily apparent to those skilled in the art, and the generic principles defined herein may be applied to other embodiments and applications without departing from the spirit and scope of the invention. Thus, this invention is not intended to be limited to the embodiments shown, but is to be accorded the widest scope consistent with the principles and features disclosed herein.

This application discloses several numerical range limitations. Persons skilled in the art will recognize that the numerical ranges disclosed inherently support any range within the disclosed numerical ranges even though a precise range limitation is not stated verbatim in the specification because this invention can be practiced throughout the disclosed numerical ranges.

What is claimed is:

1. A metallized film comprising:
   a dielectric film;
   a metal layer deposited on a portion of a surface of the dielectric film, wherein the surface of the dielectric film upon which the metal layer is deposited has a margin portion which is free of deposited metal; and
   a layer of heat fusible polymer over the metal layer and margin portion.

2. The metallized film according to claim 1, wherein the dielectric film is made from a polymer.

3. The metallized film according to claim 1, wherein the heat fusible polymer is made from a polymer which has a melting point below or at a curing temperature of the dielectric film.

4. The metallized film according to claim 1, wherein the heat fusible polymer comprises polyethylene.

5. The metallized film according to claim 1, wherein the layer of heat fusible polymer has a thickness of 0.1 $\mu$m to 1.5 $\mu$m.

6. The metallized film according to claim 1, wherein the metallized film is formed into a capacitor by rolling the film or by stacking the film in layers.

7. The metallized film according to claim 6, wherein heat and pressure is applied during the winding process or stacking process to exclude air and to fuse the metallized film together.

8. The metallized film according to claim 6, wherein the capacitor is exposed to reduced pressure to extract entrapped air and, while under reduced pressure, exposed to heat to cause the heat fusible polymer to fuse the layers of the capacitor.

9. A metallized film comprising:
   a dielectric film;
   a metal layer deposited on a portion of a surface of the dielectric film, wherein the surface of the dielectric film upon which the metal layer is deposited has a margin portion which is free of deposited metal; and
   a layer of heat fusible polymer on a surface of the dielectric film opposite the surface upon which the metal layer was deposited.

10. The metallized film according to claim 9, wherein the dielectric film is made from a polymer.

11. The metallized film according to claim 9, wherein the heat fusible polymer is made from a polymer which has a melting point below or at a curing temperature of the dielectric film.

12. The metallized film according to claim 9, wherein the heat fusible polymer comprises polyethylene.

13. The metallized film according to claim 9, wherein the layer of heat fusible polymer has a thickness of 0.1 $\mu$m to 1.5 $\mu$m.

14. The metallized film according to claim 9, wherein the metallized film is formed into a capacitor by rolling the film or by stacking the film in layers.

15. The metallized film according to claim 14, wherein heat and pressure is applied during the winding process or stacking process to exclude air and to fuse the metallized film together.

16. The metallized film according to claim 14, wherein the capacitor is exposed to reduced pressure to extract entrapped air and, while under reduced pressure, exposed to heat to cause the heat fusible polymer to fuse the layers of the capacitor.

17. A metallized film comprising:
   a dielectric film;
   a first metal layer deposited on a portion of a first surface of the dielectric film, wherein the first surface has a first margin portion which is free of deposited metal;
   a second metal layer deposited on a portion of a second surface of the dielectric film, wherein the second surface has a second margin portion which is free of deposited metal and is located on an opposite edge of the dielectric film from the first margin portion; and
   a layer of heat fusible polymer on at least one of the first and second surfaces of the dielectric film.

18. The metallized film according to claim 17, wherein the dielectric film is made from a polymer.

19. The metallized film according to claim 17, wherein the heat fusible polymer is made from a polymer which has a melting point below or at a curing temperature of the dielectric film.

20. The metallized film according to claim 17, wherein the heat fusible polymer comprises polyethylene.

21. The metallized film according to claim 17, wherein the layer of heat fusible polymer has a thickness of 0.1 $\mu$m to 1.5 $\mu$m.

22. The metallized film according to claim 17, wherein the metallized film is formed into a capacitor by rolling the film or by stacking the film in layers.

23. The metallized film according to claim 22, wherein heat and pressure is applied during the winding process or stacking process to exclude air and to fuse the metallized film together.

24. The metallized film according to claim 22, wherein the capacitor is exposed to reduced pressure to extract entrapped air and, while under reduced pressure, exposed to heat to cause the heat fusible polymer to fuse the layers of the capacitor.

25. A method of making a metallized film comprising:
   providing a dielectric film;
   depositing a metal layer onto a surface of the dielectric film; and
   depositing a heat fusible polymer layer onto a surface of the dielectric film or onto the metal layer.

26. The method of claim 25, further comprising winding the capacitor film to form a capacitor.

27. The method of claim 26, further comprising applying heat and pressure to the capacitor to exclude air and to fuse the windings of the metallized film together.

28. The method of claim 25, further comprising exposing the capacitor to reduced pressure to extract entrapped air and, while under reduced pressure, exposing the capacitor to heat to cause the heat fusible polymer to fuse the layers of the capacitor.

29. A capacitor comprising:
   a dielectric film layer;
   a metal layer; and
   a heat fusible polymer layer.

30. The capacitor according to claim 29, wherein the dielectric film is made from a polymer.

31. The capacitor according to claim 29, wherein the heat fusible polymer is made from a polymer which has a melting point below or at a curing temperature of the dielectric film.

32. The capacitor according to claim 29, wherein the heat fusible polymer comprises polyethylene.

33. The capacitor according to claim 1, wherein the layer of heat fusible polymer has a thickness of 0.1 µm to 1.5 µm.

34. A method of making a capacitor comprising:
   stacking layers of a capacitor film comprising a dielectric film layer, a metal layer, and a heat fusible polymer layer.

35. The method of claim 34, further comprising applying heat and pressure to the capacitor to exclude air and to fuse the layers of the capacitor film together.

36. The method of claim 34, further comprising exposing the capacitor to reduced pressure to extract entrapped air and, while under reduced pressure, exposing the capacitor to heat to cause the heat fusible polymer to fuse the layers of the capacitor film together.

37. A method of making a capacitor comprising:
   winding a capacitor film comprising a dielectric film layer, a metal layer, and a heat fusible polymer layer around a core.

38. The method of claim 37, further comprising applying heat and pressure to the capacitor to exclude air and to fuse the windings of the capacitor film together.

39. The method of claim 37, further comprising exposing the capacitor to reduced pressure to extract entrapped air and, while under reduced pressure, exposing the capacitor to heat to cause the heat fusible polymer to fuse the windings of the capacitor film together.

* * * * *